United States Patent [19]
Matsui et al.

[11] 3,774,150
[45] Nov. 20, 1973

[54] MOTOR VEHICLE SAFETY DEVICE

[75] Inventors: Shunji Matsui, Yokohama;
Yoshikazu Hayakawa, Yokosuka;
Kenzo Hirashima, Yokohama, all of
Japan

[73] Assignee: Nissan Motor Company, Limited,
Yokohama, Japan

[22] Filed: June 28, 1971

[21] Appl. No.: 157,403

[30] Foreign Application Priority Data
Dec. 22, 1970 Japan.............................. 45/115393

[52] U.S. Cl. ............... 340/60, 73/301, 280/150 AB
[51] Int. Cl...... B60q 1/00, G13f 23/00, B60r 21/08
[58] Field of Search ............................ 340/60, 52 R;
280/150 AB; 123/41.15; 73/64.2, 301;
200/83 A, 83 N; 180/103, 104

[56] References Cited
UNITED STATES PATENTS

| | | | |
|---|---|---|---|
| 2,592,744 | 4/1952 | Ryant, Jr. ............................ | 73/301 |
| 2,967,944 | 1/1961 | Lusted .............................. | 200/83 N |
| 3,007,017 | 10/1961 | Dwyer et al. ..................... | 200/83 A |

Primary Examiner—John W. Caldwell
Assistant Examiner—Glen Swann, III
Attorney—Robert E. Burns et al.

[57] ABSTRACT

An air bag type safety device having an alarm device that indicates when the weight of the air bag operating incombustible liquid substance such as "Freon" is below a predetermined value below which the air bag fails to be properly expanded so as to reliably protect the vehicle occupants from injury resulting from a collision. The device comprises two pressure-sensors, one for sensing a vapor pressure present within a container for the substance and the other for sensing the sum of the vapor pressure and a pressure corresponding to the wieght of the substance. A differential pressure detector is provided for detecting a pressure differential between the vapor pressure and the pressure sum, that is equal to the pressure corresponding to the weight of the substance. When the weight of the substance is below the predetermined value, an alarm lamp is lighted to indicate ineffectiveness of the air bag type safety device.

3 Claims, 2 Drawing Figures

MOTOR VEHICLE SAFETY DEVICE

BACKGROUND OF THE INVENTION

This invention relates generally to motor vehicle safety devices, and more particularly to improvements in an air bag type safety device capable of protecting the vehicle occupants from injury resulting from a collision.

As is well known, the air bag or safety cushion type safety device generally comprises an inflatable confinement which is normally stored in a folded condition in the motor vehicle and is automatically expanded to a protective condition when the motor vehicle is subjected to a sudden impact due to a collision. Initiation of the inflatable confinement into action is effected by forcing a pressurized gas into the inflatable confinement under the control of means detecting the impact exerted on the motor vehicle. This pressurized gas is usually supplied from a container storing a vaporizable substance such as liquid fluorocarbon when vaporized by heat developed by detonating explosives. However, there exists a problem in that if the weight of the vaporizable substance has decreased below a given value because of leakage from the container then the air bag fails to inflate sufficiently to reliably protect the vehicle occupants so as to prevent their bodies from striking against structural parts of the vehicle.

SUMMARY OF THE INVENTION

It is therefore an object of this invention to provide an improved motor vehicle safety device of the air bag type with a view to overcoming the above-said disadvantages.

It is another object of this invention to provide an alarm device for an air bag type safety device that is capable of giving an indication when the weight of the air bag operating substance has decreased to such a level as to fail to inflate sufficiently the air bag to reliably protect the vehicle occupants from injury resulting from a collision.

DESCRIPTION OF THE PREFERRED EMBODIMENTS

Figure 1:
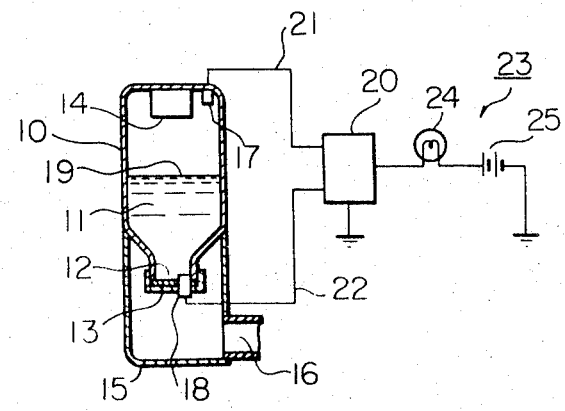
FIG. 1 is a schematic sectional view of an alarm device embodying this invention.

Referring now to FIG. 1, there is shown, in vertical section, an airtight container 10 which is placed in an inverted manner and stores a vaporizable, air bag operating incombustible substance 11 such as liquid fluorocarbon sold under the trademark "Freon." The container 10 includes a mouth 12 which is hermetically sealed by a cap or closure member 13. Means for vaporizing the liquid and discharging it includes the cap 13 adapted to be breakable or automatically removable under the influence of a gas under high pressure generated by sudden vaporizing of the vaporizable substance 11. Such vaporizing of the vaporizable substance 11 is effected by heat developed by detonating an explosive means 14 mounted at the bottom of the container 10 under the control of means for detecting a sudden impact resulting from a collision (not shown). An envelope member 15 is fixedly and hermetically secured to the lower portion of the container 10. The envelope member 15 includes an opening 16 which is adapted to be connected to an inflatable confinement generally called the air bag (not shown). Thus, in the event of a collision the closure member 13 is automatically removed to allow a gas under pressure out of the container 10 through the mouth 12 and into the inflatable confinement, so that the inflatable confinement is instantaneously expanded to a protective state.

According to this invention, there are provided in the container 10 sensing means including two pressure sensitive devices such as sensors 17 and 18, one of which is mounted above the liquid level 19 for sensing a vapor pressure within the container 10, the other of which is provided adjacent the opening 12 for sensing the sum of the vapor pressure and a pressure corresponding to the weight of the vaporizable substance 11. In the embodiment shown, the pressure sensor 18 is mounted in the closure member 13. The pressure sensors 17 and 18 are of any known type which generates an electric, pneumatic or hydraulic signal corresponding to a pressure sensed by them. In the case of electric signal, the pressure sensors 17 and 18 are electrically connected to a differential pressure detector 20 through lines 21 and 22 respectively. The differential pressure detector 20 functions to compute a pressure differential between the vapor pressure and the sum of the vapor pressure and the pressure corresponding to the weight of the vaporizable substance 11, that is equal to the pressure corresponding to the weight of the vaporizable substance 11, on the basis of the input signals from the pressure sensors 17 and 18 and to activate indicating means including an alarm device generally designated at 23 when the pressure differential and accordingly the weight of the vaporizable substance 11 had decreased below a predetermined value below which the inflatable confinement is not properly expanded so as to reliably protect the vehicle occupants.

The alarm device 23 as shown comprises an alarm lamp 24 connected at one end to the differential pressure detector 20 and at the other to a battery 25 leading to ground.

Figure 2:
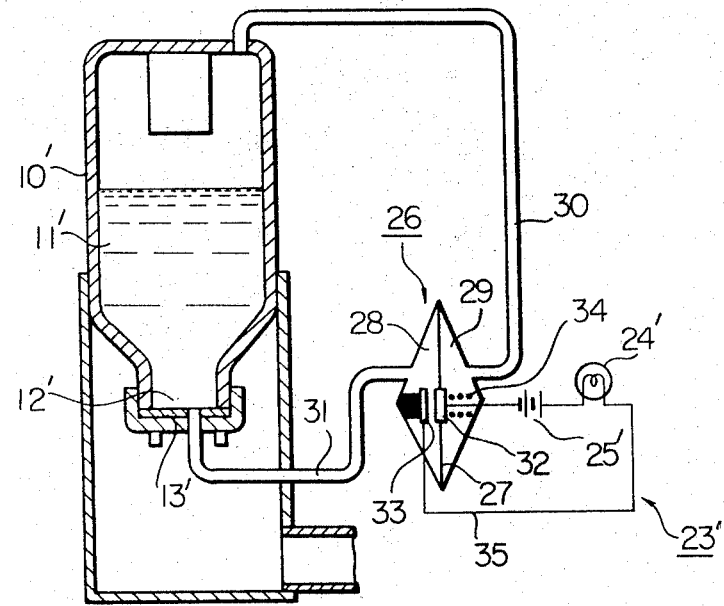
FIG. 2 is a view similar to FIG. 1, but showing another embodiment of this invention.

In FIG. 2, there is shown another embodiment of this invention which comprises a diaphragm device 26 replacing the pressure sensors 17, 18 and the differential pressure detector 20 as shown in FIG. 1. The diaphragm device 26 comprises a diaphragm 27 by which the interior of the device is divided into two chambers 28 and 29. A liquid conduit 30, which is usually a thin tube, is connected at one end to the right-hand chamber 29 of the diaphragm device 26 and at the other to that part of the container interior replete with the vapors emitting from the vaporizable substance 11'. Thus, the vapor pressure within the container 10' is transmitted into the right-hand chamber 29. Another liquid conduit 31, which is also a thin tube, opens to the mouth 12' of the container 10' through the closure member 13' and serves to transmit a pressure equal to the sum of the vapor pressure and the pressure corresponding to the weight of the vaporizable substance 11' to the left-hand chamber 28 of the diaphragm 26.

The diaphragm 27 has an electrical contact 32 provided in the center thereof, which moves in a leftward direction as viewed in FIG. 2 as the differential pressure exerted on the diaphragm 27 decreases because of leakage of the vaporizable substance 11'. Another electrical contact 33 is provided within the diaphragm device 26 away from the movable contact 32 in the direction of movement thereof. The diaphragm device 26 also includes a spring member 34 for urging the diaphragm 27 in a leftward direction as viewed in FIG. 2.

The fixed contact 33 is electrically connected through a conductor 35 to the alarm lamp 24' which in turn leads to the positive electrode of the battery 25'. The movable contact 32 is electrically connected to the negative electrode of the battery 25'.

In operation, when the container 10' is filled to the normal level, the diaphragm 27 is urged in a rightward direction as viewed in FIG. 2 by the differential pressure exerted thereon and remains in a position where the differential pressure and the force of the spring 34 are in balance. However, as the weight of the vaporizable substance 11' gradually decreases, for example, due to leakage, the diaphragm 27 moves in a leftward direction toward the fixed contact 33. It is to be noted, in this instance, that the fixed contact 33 is positioned such that it cannot be contacted by the movable contact 32 until the weight of the vaporizable substance 11' has decreased below a predetermined value below which the inflatable confinement is not properly expansible so to reliably protect the vehicle occupants from injury resulting from a collision. Thus, when the weight of the vaporizable substance 11' had decreased below the predetermined value, the movable contact 32 is brough into electrical contact with the fixed contact 33, completing the circuit of the alarm device 23', so that the alarm lamp 24' is lighted. If the container 10' is refilled to the normal level after reception of the alarm signal, then the movable contact 32 moves away from the fixed contact 33, so that the alarm lamp 24' is automatically extinguished.

As has been described above, this invention provides an improved alarm device for an air bag type safety device that is capable of giving an indication when the weight of the air bag operating substance has decreased to such a level as to fail to sufficiently inflate the air bag to reliably protect the vehicle occupants from injury resulting from a collision.

What is claimed is:

1. In a motor vehicle safety device useable with an inflatable bag: a container connected to an inflatable bag during usage of the safety device; a vaporizable liquid contained within said container; means for vaporizing said liquid and discharging same from said container to sufficiently inflate said bag to render the safety device operative in use when the volume of said liquid is no less than a predetermined value; sensing means for sensing the weight of said liquid which is a function of the volume of said liquid and for developing a signal whenever said weight is less than a first preselected value corresponding to said predetermined value; and indicating means responsive to said signal for indicating that said volume is less than said predetermined value thereby indicating that said safety device is inoperative.

2. A motor vehicle safety device according to claim 1, wherein said sensing means comprises first and second pressure sensitive devices each developing an electrical signal proportional to the pressure applied thereto, said first device disposed above the liquid level and responsive to pressure exerted by vapor within said container and said second device disposed beneath said liquid and responsive to the combined pressure exerted by said vapor pressure and by the weight of said liquid, means responsive to the signals developed by said first and second device for developing an electrical difference signal proportional to the difference between the two signals and which is proportional to the weight of said liquid, and means receptive of said difference signal for developing an output signal whenever said difference signal is less than a second preselected value proportional to said first preselected value and corresponding to the volume of said liquid being at said pretermined value.

3. A motor vehicle safety device according to claim 1, wherein said sensing means comprises means responsive to both the pressure exerted by vapor above the liquid level in said container and the combined pressure exerted by said vapor and the weight of said liquid in said container for sensing the pressure difference therebetween corresponding to the pressure exerted by the weight of the liquid and for developing an electrical signal whenever said pressure difference is less than a second preselected value proportional to said first preselected value and corresponding to the volume of said liquid being at said predetermined value.

* * * * *